United States Patent [19]

Hammond

[11] 4,325,294
[45] Apr. 20, 1982

[54] COLLAPSIBLE OUTDOOR COOKING APPARATUS

[76] Inventor: Grover M. Hammond, 2005 Vista Trail, Roanoke, Tex. 76262

[21] Appl. No.: 148,564

[22] Filed: May 9, 1980

[51] Int. Cl.³ ............................................. A47J 37/06
[52] U.S. Cl. ...................................... 99/337; 99/342;
99/393; 99/400; 99/446; 126/37 B; 126/42;
219/444; 292/DIG. 65
[58] Field of Search .................... 126/37 B, 42, 38;
99/337, 342, 385, 393, 400, 446; 188/82.5,
82.77; 292/144, 338, DIG. 65; 219/444, 472;
312/323

[56] References Cited

U.S. PATENT DOCUMENTS

| | | | |
|---|---|---|---|
| 2,021,651 | 11/1935 | Gutmann | 126/37 B |
| 2,824,205 | 2/1958 | Stickel | 219/444 |
| 3,064,554 | 11/1962 | Lamb | 99/337 |
| 3,195,442 | 7/1965 | Russell | 99/393 |
| 3,205,032 | 9/1965 | Leigh | 99/337 |
| 3,268,685 | 8/1966 | Swanson | 99/385 UX |
| 3,692,351 | 9/1972 | Christopher | 126/37 B |

FOREIGN PATENT DOCUMENTS

| | | | |
|---|---|---|---|
| 844874 | 8/1960 | United Kingdom | 126/37 B |
| 971215 | 9/1964 | United Kingdom | 126/37 B |

*Primary Examiner*—Billy J. Wilhite
*Attorney, Agent, or Firm*—James E. Bradley

[57] ABSTRACT

An apparatus for cooking food outdoors has features that allow it to be folded compactly and allow it to be permanently mounted to the owner's home. The cooking apparatus includes a housing adapted to be mounted to the wall of the building. The housing has a front opening and pivotally carries a tray. The tray has a grill and an energy source for cooking. The tray is foldable into the housing for storage. A grease container is located in the bottom of the tray. The grease container has a sloping top for catching grease, and also for containing the grease when the tray is tilted into the vertical storage position. A safety lock device prevents the tray from being moved from the cooking position to the storage position when the temperature in the tray is above a selected minimum, and also when the energy source is turned on. The apparatus includes folding doors that fold into a configuration for open cooking, a configuration for smoking, and also into a flat position for storage.

14 Claims, 9 Drawing Figures

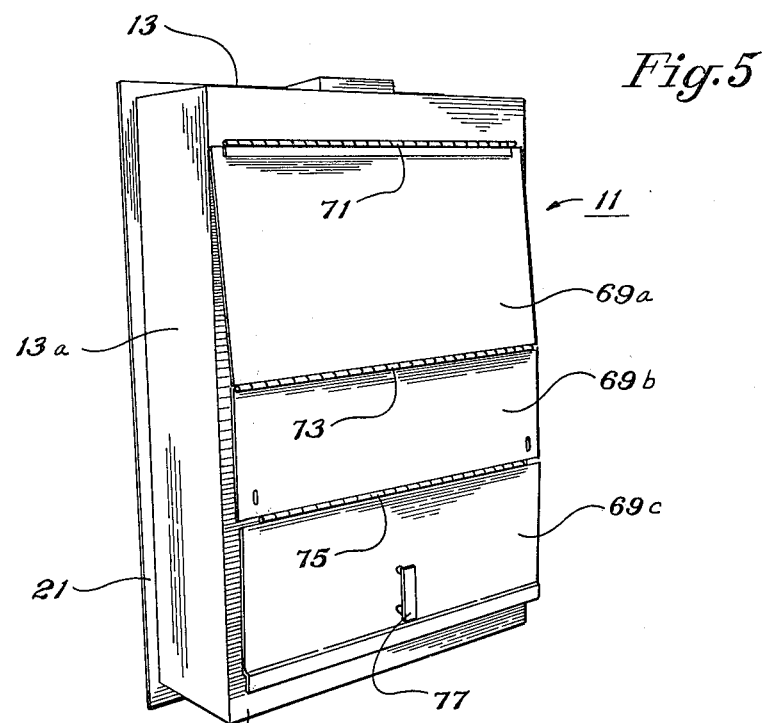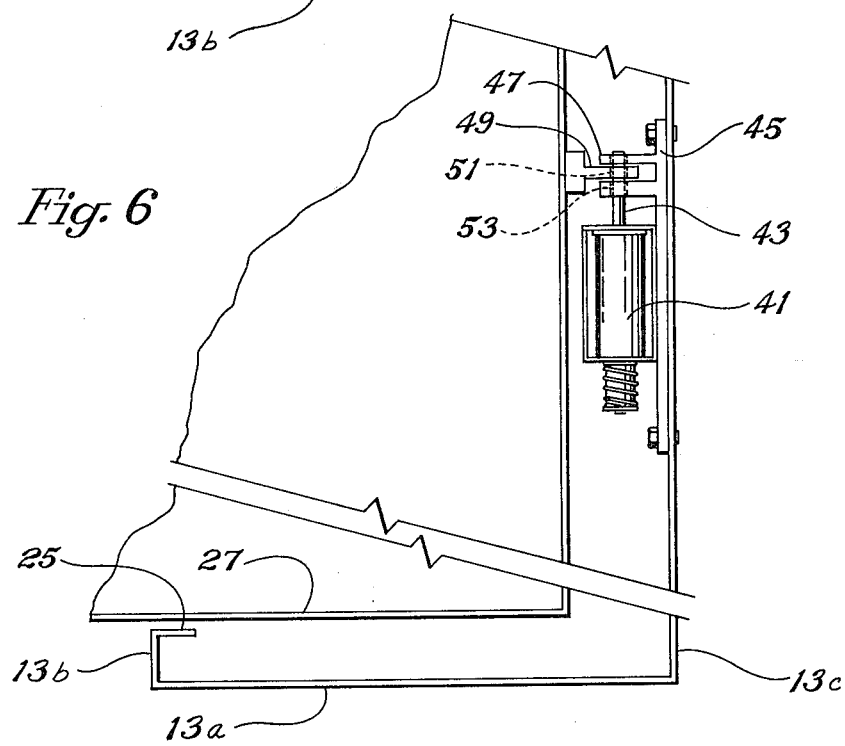

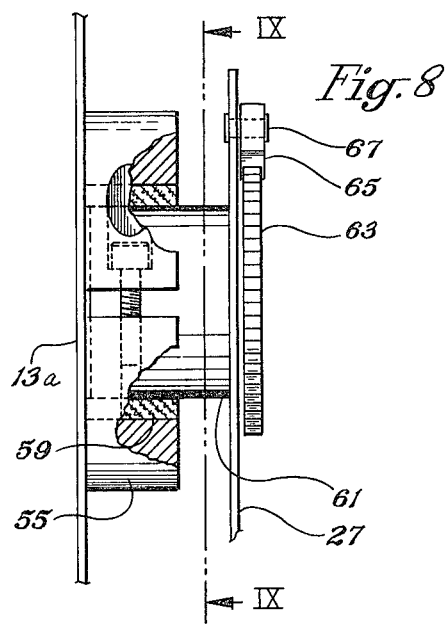
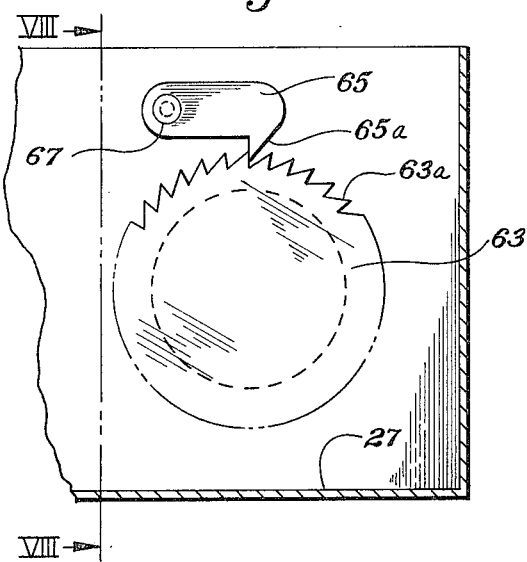
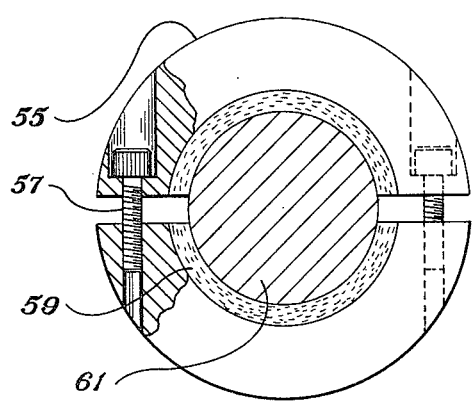

COLLAPSIBLE OUTDOOR COOKING APPARATUS

BACKGROUND OF THE INVENTION

1. Field of the Invention

This invention relates in general to outdoor cooking devices and in particular to a collapsible outdoor grill and smoker.

2. Description of the Prior Art

Outdoor cooking over a grill at home is usually done with a device using actual charcoal, or with a device that uses a fuel such as gas. In the latter case, bricks or rocks are located above the burners for receiving grease drippings, creating smoke that passes through the food being grilled. Some gas fired units are portable, carrying a bottle of gas such as propane, while others are permanently mounted on a post in the backyard.

In both cases, the devices are bulky and often in a place where the weather deteriorates the appearance and condition. In apartments, comdominiums, or small patios, there may be insufficient room for one of these units.

SUMMARY OF THE INVENTION

It is a general object of this invention to provide an improved outdoor cooking apparatus.

It is a further object of this invention to provide a permanently mounted apparatus that can be folded open for cooking and closed into a compact shape when not in use.

In accordance with these objects, a cooking apparatus is provided that has a housing with sidewalls and a front opening. The housing is adapted to be mounted to or built into a wall, with the opening facing outward. A cooking box or tray is carried in the housing. The tray has pivot means for moving between a vertical position, totally contained within the housing, to a horizontal cooking position protruding outward from the opening. The tray has a conventional grill and energy means for supplying heat for cooking.

In the preferred embodiment, a container is located below the burners for catching drippings. The container has a partial sloping top that catches drippings, allowing them to flow into the container. When the tray is tilted vertically for storage, the container serves to hold the collected grease. Also, the tray preferably has a safety lock means that prevents the tray from being moved from the horizontal position to the vertical position when the temperature in the tray exceeds a selected minimum, or when the energy means is providing heat.

BRIEF DESCRIPTION OF THE DRAWINGS

FIG. 5 is a perspective view of the cooking apparatus of FIG. 1, shown in the storage mode.

FIG. 6 is a sectional view of the cooking apparatus of FIG. 1, taken along the lines VI—VI of FIG. 4.

FIG. 7 is a sectional view of the cooking apparatus of FIG. 1, taken along the lines VII—VII of FIG. 3.

FIG. 8 is a sectional view of the cooking apparatus of FIG. 1, taken along the lines VIII—VIII of FIG. 7.

FIG. 9 is a sectional view of the cooking apparatus of FIG. 1, taken along the lines IX—IX of FIG. 8.

DESCRIPTION OF THE PREFERRED EMBODIMENT

Figure 1:
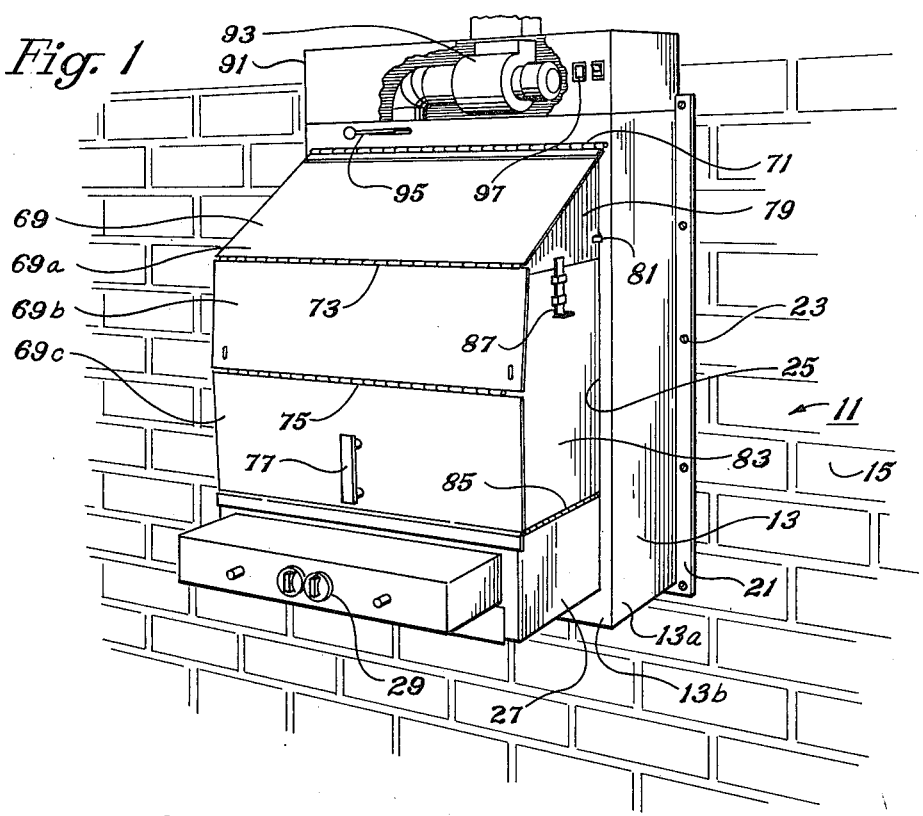
FIG. 1 is a perspective view partially broken away, of the cooking apparatus constructed in accordance with this invention, with the apparatus shown in the smoker mode.
Figure 4:
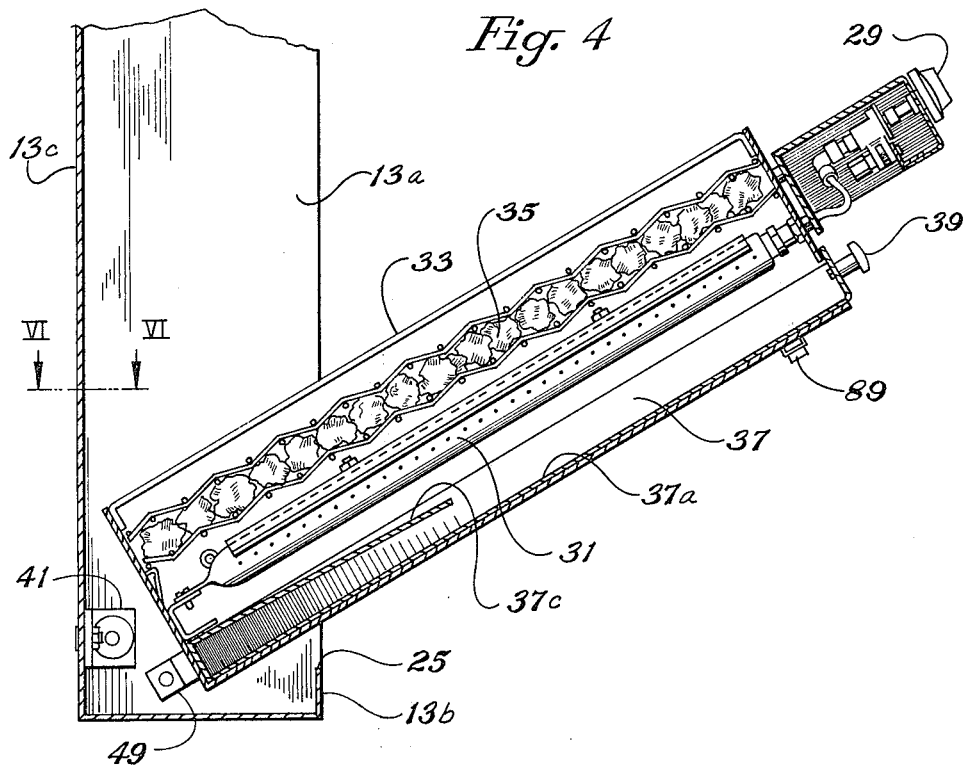
FIG. 4 is a sectional view of the cooking apparatus of FIG. 1, taken along the lines IV—IV of FIG. 3.

Referring to FIG. 1, the cooking apparatus 11 has a rectangular housing 13 mounted to a wall 15 of a building. Housing 13 has four sidewalls 13a, a front wall 13b, and a back wall 13c (FIG. 4). A flange 21 extends around the perimeter of the sidewalls 13a at the intersection with the back wall 13c. Bolts 23 extend through the flanges 21, serving as means for mounting housing 13 to a wall 15. The housing may also be mounted in an opening in building wall 15 with the front wall 13b flush with wall 15.

Figure 2:
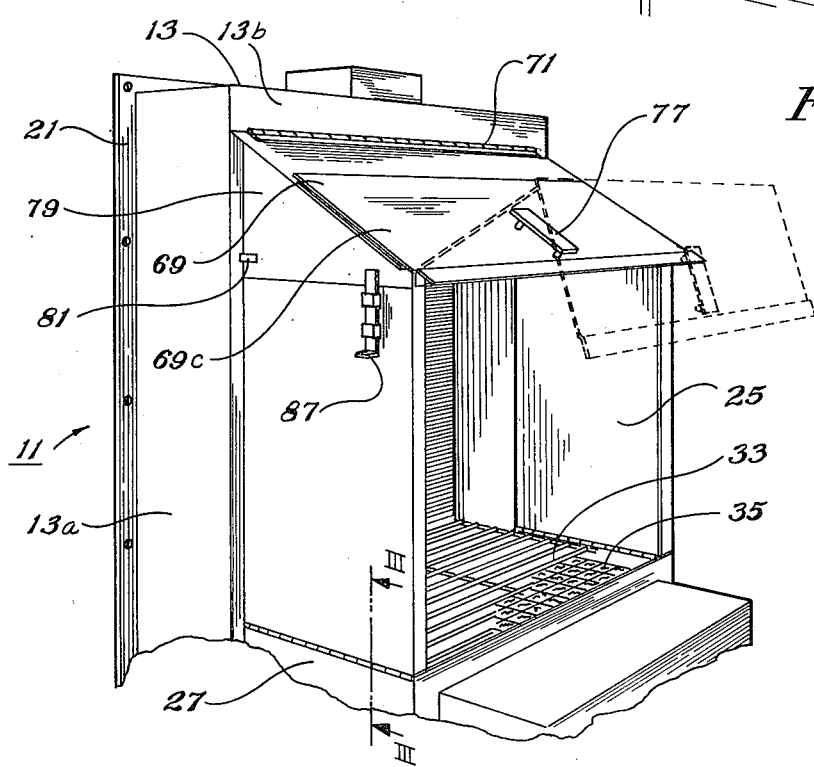
FIG. 2 is a partial perspective view of the cooking apparatus of FIG. 1, shown in the grilling mode.
Figure 3:
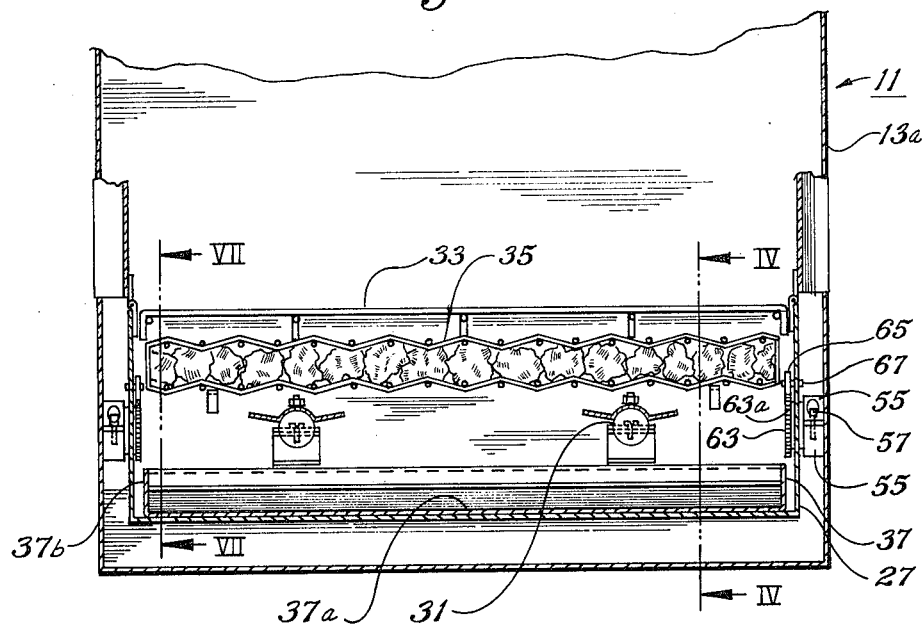
FIG. 3 is a sectional view of the cooking apparatus of FIG. 1, taken along the lines III—III of FIG. 2.

Front wall 13b has a rectangular opening 25, within which a cook box or tray 27 is mounted. The tray 27 is pivotally mounted to the housing sidewalls 13b, allowing it to be tilted from a horizontal cooking position, shown in FIGS. 1 and 2, to a vertical position for storage, as shown in FIG. 5. Tray 27 has controls 29, which are part of the energy means for supplying gas to burners 31 (FIG. 3) for heat, although electric heat may be used instead. As shown in FIG. 2, a grill 33 is carried on the top of tray 27 for holding food for cooking. A rock basket 35, shown in FIGS. 2, 3 and 4, is located above burners 31 and below grill 33 for collecting drippings and spreading the heat from the burners 31. Rock basket 35 consists of a wire frame, within which natural lava rocks are packed.

Referring to FIGS. 3 and 4, a grease drippings container 37 is located in the tray 27 below burners 31. Container 37 is rectangular, extending substantially across the width and length of tray 27. As shown in FIG. 4, the container 37 is a relatively shallow pan with a bottom 37a and four sidewalls 37b. It has a top plate 37c that extends from the rear sidewall 37b forwardly about forty percent of the length of the container. Top 37c slopes downwardly from the rear sidewall 37b for allowing grease falling on top 37c to flow into the open portion of the container 37. Top 37c lies in a plane that will intersect the plane of the bottom 37a at an acute angle. Container 37 is slidingly carried in the tray 27, and can be removed by pulling forwardly on handle 39, as shown in FIG. 4. When tilted into a vertical position, the top 37c, sidewalls 37b and bottom 37a define a receptacle for holding collected grease, preventing it from spilling when tilted.

FIG. 6 illustrates a safety lock means for preventing the tray 27 from being tilted from the horizontal cooking position to the vertical storage position when the temperature in the tray 27 is above a selected minimum. Also the safety lock means prevents the tray from being tilted upward when the controls 29 to the energy means are turned on. The safety lock means include a solenoid assembly 41 that has a plunger 43 normally carried in a retracted position, with FIG. 6 showing the plunger in the extended position. Solenoid assembly 41 includes a temperature sensing means that will cause the plunger 43 to extend forwardly when the temperature at the back of tray 27 exceeds about 150° F. (Fahrenheit). Solenoid assembly 41 is also connected to an electrical switch included within controls 29 that energizes the solenoid assembly 41, causing the plunger to extend when the controls 29 are turned on.

Solenoid assembly 41 is mounted on a bracket 45, mounted to the housing back wall 13c. Bracket 45 includes a pair of flanges 47, mounted parallel to each other and extending forwardly from back wall 13c. A tab 49 is mounted to the back sidewall 37b of container 37. Tab 49 is positioned so that it will align and move between flanges 47 when the tray 27 is in the horizontal position. Flanges 47 and tab 49 have mating apertures 51 and 53 for receiving the plunger 43 when extended. Plunger 43 will lock the tab 49 to the flanges 47, preventing the tray from being tilted while the plunger 43 is in the extended position.

The pivot means for moving the tray between the vertical position and the horizontal position is shown in FIGS. 7, 8 and 9. The pivot means includes a brake drum 55 of two semi-circular sections, secured together by screws 57. The lower half of the drum 55 is rigidly mounted to a housing sidewall 13a. Each half of drum 55 has an inner liner 59 of resilient brake band material. A shaft 61 is adapted to be placed within the circular opening defined by the inner sides of the liners 59. Screws 57 allow the liners 59 to be clamped to the shaft 61 to a desired degree of frictional drag. Shaft 61 extends slidingly through one of the sides of tray 27. A ratchet 63, having inclined teeth 63a, is rigidly secured to the inner end of the shaft 61, as shown also in FIG. 7. A pawl 65 is pivotally mounted to the side of tray 27 by a pin 67 above ratchet 63. Pawl 65 has a tooth 65a on its free end that is adapted to engage the teeth 63a if relative motion between the teeth 63a and pawl 65 is in one direction, and to disengage if the relative motion is in the other direction.

As shown in FIG. 7, when the tray 27 is tilted upwardly, or clockwise, pawl 65 will not engage the ratchet 63. When the tray 27 is tilted downwardly, the pawl 65 will engage the ratchet 63, causing shaft 61 to rotate and frictionally drag within brake drum 55. The ratchet 63, pawl 65, and drum 55 serve as resistance means for retarding speed as the tray moves from the vertical to the horizontal position, but allowing free movement when moving the tray from the horizontal position to the vertical position. Preferably, the drum 55, ratchet 63 and pawl 65 assembly are located on both sides of the cooking apparatus 11.

Referring again to FIG. 1, a door 69 is mounted to the housing 13 at the top of the housing opening 25. Door 69 has a first or upper panel 69a connected to the housing 13 by a hinge 71. a second panel 69b is connected to the first panel by a hinge 73. A third panel 69c is connected to the second panel by a hinge 75. A handle 77 is mounted to the third panel 69c. Hinges 73 and 75 allow the panels to be folded one on the other, as shown in FIG. 2, forming a hood for open grilling. The panels also fold into an enclosure for retaining smoke, as shown in FIG. 1, or into a single plane for storage, indicated in FIG. 5.

The first panel 69a has a triangular panel 79 secured to it on each side. Each triangular panel 79 has a spring stop 81 that bears against the housing front wall 13b to hold the first panel 69a in an outer position, as shown in FIG. 1. In this position, first panel 69a lies at an acute angle of about 60 degrees with respect to housing front wall 13b. Spring stop 81 can be overcome by pressure to move the first panel 69a to a position parallel with the housing front wall 13b, with the triangular panels 79 sliding within the housing 13.

A pair of side curtains 83 are mounted by hinges 85 to the top of the tray 27, on opposite sides. Hinges 85 allow the side curtains 83 to fold over one another into a plane substantially parallel with the grill 33, or to fold into a vertical position as shown in FIGS. 1 and 2. In the vertical position, side curtains 83 will be perpendicular to the housing front wall 13b. A slide latch 87 will slide between the upper portion of each side curtain 83 and the lower portion of each triangular panel 79 to retain the side curtains 83 in the vertical position. The slide latches 87 and the triangular panel 79 serve as engaging means for engaging the first panel 69a with the side curtains 83 when the first panel is folded outward and when the side curtains are in vertical position.

Referring to FIG. 4, a slide latch 89 engages the housing 13 to retain the tray 27 in a vertical position for storage. Referring to FIG. 1 again, a control module 91 is adapted to be mounted to the top of housing 13. Module 91 is shown only in FIG. 1, and includes a blower 93 for drawing smoke from within the cooking apparatus. A damper control 95 controls a damper (not shown) leading to the fan 93. A warning light 97 indicates when the safety lock means is in engagement. Blower 93 can be connected to a conventional chimney used for a fireplace, or connected to a separate conduit.

In operation, the unit will normally appear as shown in FIG. 5, except that the door 69 will lie in a true plane, rather than being slightly open as shown in FIG. 5. Tray 27 will be wholly contained within the housing 13 and will be in the vertical position. To use the cooking apparatus 11, first the door panels 69b and 69c are folded over the panel 69a. Then panel 69a is pulled outward, as shown in FIG. 1. Then, the slide latch 89 is retracted, and tray 27 is pivoted from the vertical position to the horizontal position. During this pivoting movement, as shown in FIGS. 7, 8 and 9, pawl 65 will engage ratchet 63, causing shaft 61 to rotate within the tight constraints of the brake drum linings 59. This friction will prevent the tray 27 from moving too quickly, possibly damaging its components.

When in the horizontal position, side curtains 83 will be folded upright, and side latches 87 actuated to retain them with the triangular panels 79. The unit is now in condition for cooking. Preferably a piezo-electric starter (not shown) is used to ignite the gas when the controls 29 are turned on. When turned on, the electrical switch within the controls 29 will engage the solenoid 41, as shown in FIG. 6. causing its plunger 43 to extend through the apertures 51 and 53, locking the tray 27 in the horizontal position. During cooking, the door 69 can remain open, as shown in FIG. 2, or it can be closed for smoking, as shown in FIG. 1. If closed, panels 69b and 69c will be coplanar and in contact with the front edges of side curtains 83. After the cooking is completed, tray 27 can be folded back into the housing 13, and door 69 closed, as shown in FIG. 5. However, if the temperature in the housing behind tray 27 is more than 150° F., the thermal sensor connected with the solenoid assembly 41 will not allow the plunger 43 to retract, even if the controls 29 have been turned off. Once sufficiently cool, the plunger 43 will retract allowing tray 27 to be tilted upward. When tilted upward, the inclined top 37c of container 37 will prevent spillage. During upward tilting, pawl 65 will not engage ratchet 63, thus the tray 27 will rotate with respect to shaft 61, and shaft 61 will not turn in drum 55.

The invention shown has significant advantages. The cooking apparatus is compact, and can be positioned out of the way and out of the weather on almost any patio or outside wall of a building. The safety lock means prevents accidents that might occur should one inadvertently tilt the tray to the storage position while the tray is too hot or while the controls are still turned on. The partially covered grease container allows tilting, without spilling grease. The folding doors allow the unit to be used both as an open grill and as a smoker.

While the invention has been shown in only one of its forms, it should be apparent to those skilled in the art that it is not so limited but is susceptible to various improvements and modifications thereof.

I claim:

1. A cooking apparatus, comprising in combination:
   a housing having sidewalls and a front opening;
   mounting means for mounting the housing to a building wall with the opening facing outward;
   a tray carried in the housing;
   pivot means for moving the tray between a vertical position contained within the housing, to a horizontal position protruding outward from the opening;
   a grill carried by the tray for holding food for cooking;
   frame means mounted in the tray below the grill for carrying a plurality of rocks; and
   energy means carried by the tray and having burners below the grill for providing heat.

2. A cooking apparatus, comprising in combination:
   a housing having sidewalls and a front opening;
   mounting means for mounting the housing to a building wall with the opening facing outward;
   a tray carried in the housing;
   pivot means for moving the tray between a vertical position contained within the housing, to a horizontal position protruding outward from the opening;
   a grill carried by the tray for holding food for cooking;
   energy means carried by the tray and having burners below the grill for providing heat; and
   a container carried in the tray below the burners for catching grease dripped from the food, the container having a bottom wall, sidewalls, and a top wall that extends over only a portion of the container, the top wall sloping toward the open portion of the container to allow grease to flow down the top wall and into the container, the top wall, sidewall and bottom wall defining a receptacle for holding grease when the tray is in the vertical position.

3. The apparatus according to claim 1 further comprising:
   safety lock means for preventing the energy means from being on when the tray is in the vertical position, regardless of the temperature of the tray.

4. A cooking apparatus, comprising in combination:
   a housing having sidewalls and a front opening;
   mounting means for mounting the housing to a building wall with the opening facing outward;
   a tray carried in the housing;
   pivot means for moving the tray between a vertical position contained within the housing, to a horizontal position protruding outward from the opening;
   a grill carried by the tray for holding food for cooking;
   energy means carried by the tray and having burners below the grill for providing heat;
   safety lock means for preventing the tray from being moved from the horizontal position to the vertical position when the temperature in the tray exceeds a selected minimum temperature, and also when the energy means is turned on; the safety lock means comprising:
   a solenoid assembly having a plunger that is adapted to engage the tray when the tray is in the horizontal position, the solenoid assembly having temperature sensing means for causing the plunger to engage the tray when the temperature is above a selected minimum, also, the energy means having a control with electrical switching means that causes the plunger to engage the tray when the control is turned on.

5. The apparatus according to claim 1 further comprising:
   resistance means mounted between the tray and the housing for retarding speed as the tray moves from the vertical to the horizontal position, but allowing free movement when moving the tray from the horizontal position to the vertical position.

6. A cooking apparatus, comprising in combination:
   a housing having sidewalls and a front opening;
   mounting means for mounting the housing to a building wall with the opening facing outward;
   a tray carried in the housing;
   pivot means for moving the tray between a vertical position contained within the housing, to a horizontal position protruding outward from the opening;
   a grill carried by the tray for holding food for cooking;
   energy means carried by the tray and having burners below the grill for providing heat;
   the pivot means comprising a shaft mounted between one of the sidewalls of the housing and a sidewall of the tray on each side of the apparatus, allowing the tray to rotate about the axes of the shafts from the horizontal to the vertical position; and
   resistance means mounted between the tray and the housing for retarding speed as the tray moves from the vertical to the horizontal position, but allowing free movement when moving the tray from the horizontal position to the vertical position.

7. The apparatus according to claim 6 wherein the resistance means is mounted to at least one of the shafts and comprises:
   a brake band mounted to one of the sidewalls around the shaft, applying friction to retard rotation speed of the shaft;
   a ratchet rigidly mounted to the shaft for rotation therewith;
   a pawl pivotally mounted to the other sidewall and adapted to engage the ratchet to cause the shaft to rotate in the brake band when the tray is moved from vertical to the horizontal position, and when the tray is moved from the horizontal to the vertical position, the pawl being in disengagement with the ratchet so that the shaft is not forced to rotate within the brake band.

8. A cooking apparatus, comprising in combination:
   a housing having sidewalls and a front opening;
   mounting means for mounting the housing to a building wall with the opening facing outward;
   a tray carried in the housing;

pivot means for moving the tray between a vertical position contained within the housing, to a horizontal position protruding outward from the opening;

a grill carried by the tray for holding food for cooking;

energy means carried by the tray and having burners below the grill for providing heat;

a pair of side curtains hinged to the tray on each side of the apparatus, and adpated to be folded from a horizontal position on top of the grill for storage to a vertical position when the tray is in the horizontal position;

a door having a first panel hinged to the front of the housing, a second panel hinged to the first panel, and a third panel hinged to the second panel; and engaging means for engaging the first panel with the side curtains when the first panel is folded outward and the side curtains are in vertical position, defining a cooking position, the second and third panels being foldable over each other and over the first panel when in the cooking position to define an opening for open cooking, the second and third panels also being adapted to lie vertically against the front edges of the side curtains while in the cooking position to enclose the grill to retain smoke.

9. The apparatus according to claim 8 wherein the retention means comprises:

a pair of triangular panels mounted to the first panel on each side; and a latch extending between each triangular panel and each side curtain for securing them together.

10. A cooking apparatus, comprising in combination:

a rectangular housing having sidewalls and a rectangular front opening;

mounting means for mounting the housing to a building wall with the opening facing outward;

a tray pivotally mounted in the housing and foldable between a vertical position in which it is wholly contained within the housing, and a horizontal position protruding outward from the opening;

a grill carried by the tray for holding food for cooking;

energy means carried by the tray and having burners below the grill for providing heat;

a plurality of rocks mounted in a frame above the burners and below the grill;

a container carried in the tray below the burners for catching grease dripped from the food, the container having a bottom wall, sidewalls, and a top wall that extends from the rear over only a portion of the container, the top wall sloping down from the rear toward the open portion of the container to allow grease to flow down the top wall and into the container, the top wall, sidewalls, and bottom wall holding the collected grease when the tray is in the vertical position; and safety lock means for preventing the tray from being moved from the horizontal position to the vertical position when the temperature in the tray exceeds a selected minimum, and also when the energy means is actuated.

11. The apparatus according to claim 10 further comprising:

resistance means mounted between the tray and the housing for retarding speed as the tray moves from the vertical to the horizontal position, but allowing free movement when moving the tray from the horizontal position to the vertical position.

12. The apparatus according to claim 10 further comprising:

a pair of side curtains hinged to the tray on each side, and adapted to be folded from a horizontal position on the top of the grill for storage to a vertical position when the tray is in the horizontal position;

a door having a first panel hinged to the front of the housing above the opening, a second panel hinged to the first panel, and a third panel hinged to the second panel; and engaging means for engaging the first panel with the side curtains when the first panel is folded outward and the side curtains are in vertical position, defining a cooking position, the second and third panels being foldable over each other and over the first panel when in the cooking position to define an opening for open cooking, the second and third panels also being adapted to lie vertically against the front edges of the side curtains while in the cooking position to enclose the grill to retain smoke.

13. A cooking apparatus, comprising in combination:

a housing having sidewalls and a front opening;

mounting means for mounting the housing to a building wall with the opening facing outward;

a tray carried in the housing;

pivot means for moving the tray between a vertical position contained within the housing, to a horizontal position protruding outward from the opening;

a grill carried by the tray for holding food for cooking;

frame means mounted in the tray below the grill for carrying a plurality of rocks;

energy means carried by the tray and having burners below the grill for providing heat; and enclosure means mounted to the apparatus for folding into an enclosure over the tray when the tray is in the horizontal position, and for folding into a flat storage position when the tray is in the vertical position.

14. The apparatus according to claim 13 wherein the enclosure means comprises:

a pair of side curtains;

side curtain mounting means for mounting the side curtains to the apparatus for movement between a cooking position in which the side curtains are vertical and located on each side of the tray when the tray is in the horizontal position, and a storage position in which the side curtains are within the housing and the tray is in the vertical position; and door means mounted to the apparatus for movement between a closed cooking position defining with the side curtains an enclosure above the tray with the tray in the horizontal position, and an open cooking position in which the tray is exposed while in the horizontal position.

* * * * *